J. C. MILLER.
WHEEL BLOCK.
APPLICATION FILED JULY 22, 1918.
1,427,222.
Patented Aug. 29, 1922.
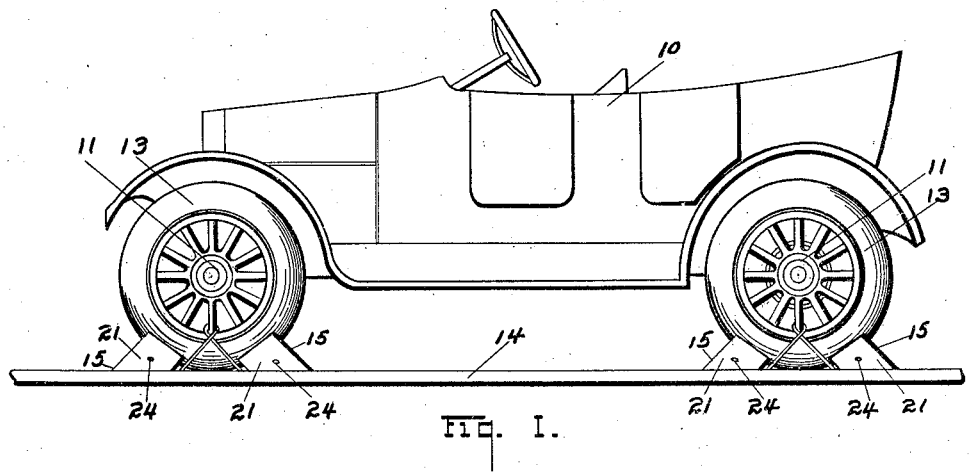
Fig. I.
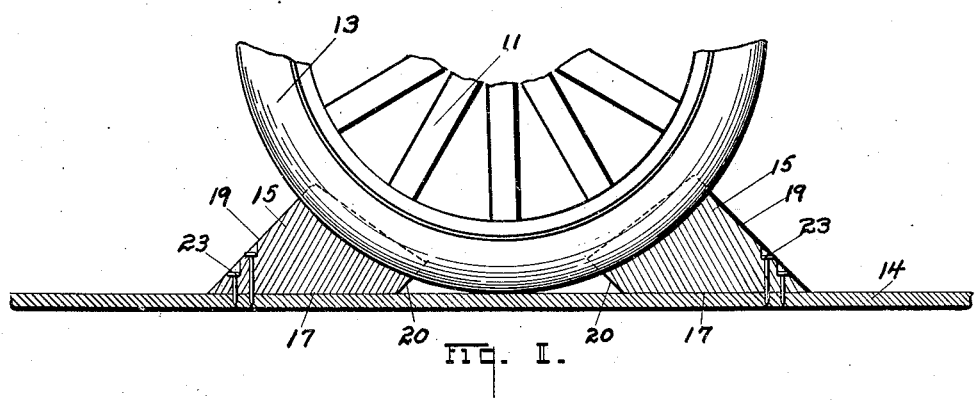
Fig. II.
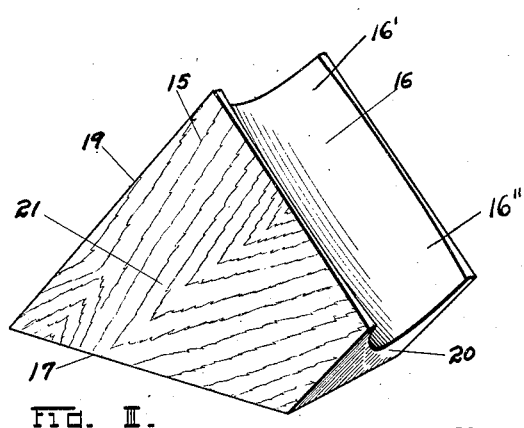
Fig. III.
Inventor
John C. Miller
By Chester W. Braselton
Attorney

UNITED STATES PATENT OFFICE.

JOHN C. MILLER, OF TOLEDO, OHIO, ASSIGNOR TO THE WILLYS-OVERLAND COMPANY, OF TOLEDO, OHIO, A CORPORATION OF OHIO.

WHEEL BLOCK.

1,427,222.   Specification of Letters Patent.   Patented Aug. 29, 1922.

Application filed July 22, 1918. Serial No. 246,225.

*To all whom it may concern:*

Be it known that I, JOHN C. MILLER, a citizen of the United States, residing at Toledo, county of Lucas, and State of Ohio, have invented certain new and useful Improvements in Wheel Blocks, of which I declare the following to be a full, clear, and exact description.

This invention relates to wheel blocks and has for its object to provide an improved and economical wheel block for effectively blocking the wheels of an automobile during shipment.

Further objects, and objects relating to economies of manufacture and details of construction, will definitely appear from the detailed description to follow.

The invention is clearly defined and pointed out in the appended claims, and the preferred embodiment thereof is illustrated in the accompanying drawing, forming a part of this specification, in which:

Figure I is a side elevation of an automobile showing the application of the invention to the wheels thereof.

Figure II is a longitudinal view illustrating the manner of applying the blocks in blocking position to the wheels of the vehicle.

Figure III is a detail, perspective view of my improved wheel block.

Referring to the drawings, 10 designates the body of an automobile and 11 the wheels thereof, the wheels being provided with the pneumatic tires 13. A deck or floor is indicated at 14 on which the automobile rests. My improved block 15 is positioned at the front and rear of the wheels and secured to the deck 14 whereby the wheels are blocked against movement.

As clearly shown by Figure III, the block 15 has a concave face 16 curved to fit the contour of the tires 13, and a base 17 which extends from the inner end of the concave face 16 to a point considerably beyond the outer or upper end of the concave surface whereby the block is properly seated to receive any pressure from a wheel on said concave or curved face 16. The block further has the parallel end faces 19 and 20 and the like side faces 21. As is obvious, the outwardly extended end of the block formed by the extended base 17 and end face 19 greatly strengthens the block and prevents splitting when pressure from a wheel is exerted against the sides of the concave face 16. Also, the block is cut so that the direction of the grain of the wood is longitudinal thereof, and hence, at right angles to the direction of pressure from a wheel on the concave face 16. This adds to the strength of the block and tends to prevent splitting.

When positioning the block 15, it is thrust under the front or rear of a tire 13 so that the tire is seated on the concave face 16. The block is then secured to the deck or floor 14 by spikes 23, which are driven through the block at the outer end thereof and into the deck or floor. The spikes may be driven substantially straight or perpendicular to the floor or deck and thus the spikes offer a greater resistance to the backward or forward thrusts of a wheel without being withdrawn from the deck or floor, than if they were driven on a slant. The blocks may be further secured to the deck or floor 14 by spikes 24 which are driven from the side faces 21 through the block and into the deck or floor.

In the above description and accompanying drawings, I have shown and described my improved wheel block when used for blocking the wheels of an automobile during shipment. It is to be understood, however, that the invention is not to be so limited as indicated by the appended claims.

Having thus described my invention, what I claim as new and desire to secure by Letters Patent, is:—

1. A wooden block for blocking a vehicle wheel, said block having a plane surface forming a base for said block, an end face making an acute angle with said base whereby the block may be readily nailed to a flooring, and a third face shaped to conform to and adapted to engage the outer surface of a vehicle tire.

2. A chock block for a vehicle wheel comprising a solid wooden block having a flat supporting face, a curved face adapted to engage the vehicle wheel and a plain face making an acute angle with said supporting face whereby said block may be readily secured to a floor by nails driven through the resulting wedge shaped portion thereof.

In testimony whereof, I affix my signature.

JOHN C. ×(his mark) MILLER.

Witnesses:
E. B. WHITCOMB,
L. J. LANGENDERFER.